United States Patent
Cheong et al.

(10) Patent No.: US 12,057,594 B2
(45) Date of Patent: Aug. 6, 2024

(54) BATTERY MODULE

(71) Applicant: SK On Co., Ltd., Seoul (KR)

(72) Inventors: Hoemin Cheong, Daejeon (KR); Ju Yong Park, Daejeon (KR); Seul Gi Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/455,622

(22) Filed: Aug. 25, 2023

(65) Prior Publication Data

US 2024/0136625 A1   Apr. 25, 2024
US 2024/0234893 A9   Jul. 11, 2024

(30) Foreign Application Priority Data

Oct. 24, 2022   (KR) .......... 10-2022-0137460

(51) Int. Cl.
*H01M 50/233* (2021.01)
*H01M 50/211* (2021.01)
*H01M 50/224* (2021.01)
*H01M 50/244* (2021.01)
*H01M 50/276* (2021.01)

(52) U.S. Cl.
CPC ....... *H01M 50/233* (2021.01); *H01M 50/211* (2021.01); *H01M 50/224* (2021.01); *H01M 50/244* (2021.01); *H01M 50/276* (2021.01)

(58) Field of Classification Search
CPC . H01M 50/211; H01M 50/224; H01M 50/276
See application file for complete search history.

(56) References Cited

U.S. PATENT DOCUMENTS

2016/0361782 A1   12/2016   Saito et al.
2018/0138565 A1*  5/2018   Lee ................... H01M 10/6554
2018/0287102 A1* 10/2018   Ullmann ............. H01M 50/103

FOREIGN PATENT DOCUMENTS

| CN | 113632303 A | 11/2021 |
| CN | 113710406 A | 11/2021 |
| CN | 113939946 A | 1/2022 |
| EP | 3952015 A1 | 2/2022 |

(Continued)

OTHER PUBLICATIONS

Welding—Electron and laser beam welded joints—Guidance on quality levels for imperfections, Part 2: Aluminium and its weldable alloys, International Standard, ISO 13919-2, Oct. 1, 2001, pp. 1-10, First edition.

(Continued)

*Primary Examiner* — Gregg Cantelmo
(74) *Attorney, Agent, or Firm* — IP & T GROUP LLP

(57) ABSTRACT

A battery module according to the present disclosure comprises a cell stack comprising a plurality of battery cells; and a module case covering the outside of the cell stack. A module case comprises a first case comprising a rib and a first coupling portion that has a greater thickness than that of the rib and that is connected to a side of the rib; a second case comprising a second coupling portion facing an upper portion of the rib and a side of the first coupling portion; a tunnel portion formed between the rib, the first coupling portion, and the second coupling portion; and a welding portion in which a boundary area of the first coupling portion and the second coupling portion is welded.

8 Claims, 7 Drawing Sheets

(56) References Cited

FOREIGN PATENT DOCUMENTS

KR  10-2021-0079190 A    6/2021
WO  WO-2020155201 A1 *  8/2020  .......... H01M 50/204

OTHER PUBLICATIONS

Extended European Search Report for the European Patent Application No. 23194498.4 issued by the European Patent Office on Apr. 15, 2024.

* cited by examiner

BATTERY MODULE

CROSS-REFERENCE TO RELATED PATENT APPLICATION

The present application claims priority under 35 U.S.C. § 119(a) to Korean patent application number 10-2022-0137460 filed on Oct. 24, 2022, in the Korean Intellectual Property Office, the entire disclosure of which is incorporated by reference herein.

BACKGROUND OF THE INVENTION

1. Field

The present disclosure relates to a secondary battery, and specifically, to a battery module.

2. Description of the Related Art

Recently, research on battery modules has been actively conducted. A battery module may comprise one or more battery cells. A battery cell may represent a minimum unit of a battery that can be charged and discharged.

A battery module may comprise a module case for protecting battery cells. A module case may comprise an upper case, a lower case, and the like. An upper case and a lower case may be coupled to each other through welding.

On the other hand, when welding is performed in a state where pores exist inside a welding portion, appearance defects such as weld burst marks caused by gas may be generated on the surface of the welding portion. A method for reducing such appearance defects of welding is being sought.

SUMMARY OF THE INVENTION

An Example of the present disclosure provides a battery module having improved welding quality.

A battery module according to an Example comprises a cell stack comprising a plurality of battery cells; and a module case covering the outside of the cell stack. A module case comprises a first case comprising a rib and a first coupling portion that has a greater thickness than that of the rib and that is connected to a side of the rib; a second case comprising a second coupling portion facing an upper portion of the rib and a side of the first coupling portion; a tunnel portion formed between the rib, the first coupling portion, and the second coupling portion; and a welding portion in which a boundary area of the first coupling portion and the second coupling portion is welded.

In an Example, a tunnel portion may be formed to extend in the length direction of a welding portion.

In an Example, a tunnel portion may comprise a first recessed portion in which a part of a first coupling portion is recessed and a second recessed portion in which a part of a rib is recessed. A first recessed portion may contact a side of a second coupling portion. A second recessed portion may contact a lower portion of a second coupling portion. A first recessed portion and a second recessed portion may be connected to each other.

In an Example, the cross-sectional shape of a first recessed portion and a second recessed portion in the length direction may be at least a part of one of a polygonal shape, a circular shape, and an elliptical shape.

In an Example, a tunnel portion may comprise a third recessed portion in which a part of a second coupling portion is recessed, and the third recessed portion may contact an upper portion of a rib and a side of a first coupling portion.

In an Example, the cross-sectional shape of a third recessed portion in the length direction may be at least a part of one of a polygonal shape, a circular shape, and an elliptical shape.

In an Example, the horizontal length of the cross-section of a third recessed portion in the length direction may be equal to or greater than the vertical length of the cross-section of the third recessed portion.

In an Example, a first case and a second case may be aluminum cases manufactured in different ways with each other.

In an Example, one of a first case and a second case may be an aluminum case manufactured by rolling or extrusion, and the other of the first case and the second case may be an aluminum case manufactured by die casting.

In an Example, a welding portion may be formed by laser welding.

An Example of the present disclosure may provide a battery module having improved welding quality.

DETAILED DESCRIPTION

Structural or functional descriptions of Examples disclosed in the present specification or application are merely illustrated for the purpose of describing Examples according to the technical principle of the present invention. In addition, Examples according to the technical principle of the present invention may be implemented in various forms other than the Examples disclosed in the present specification or application. In addition, the technical principle of the present invention is not to be construed as being limited to the Examples described in this specification or application.

Figure 1:
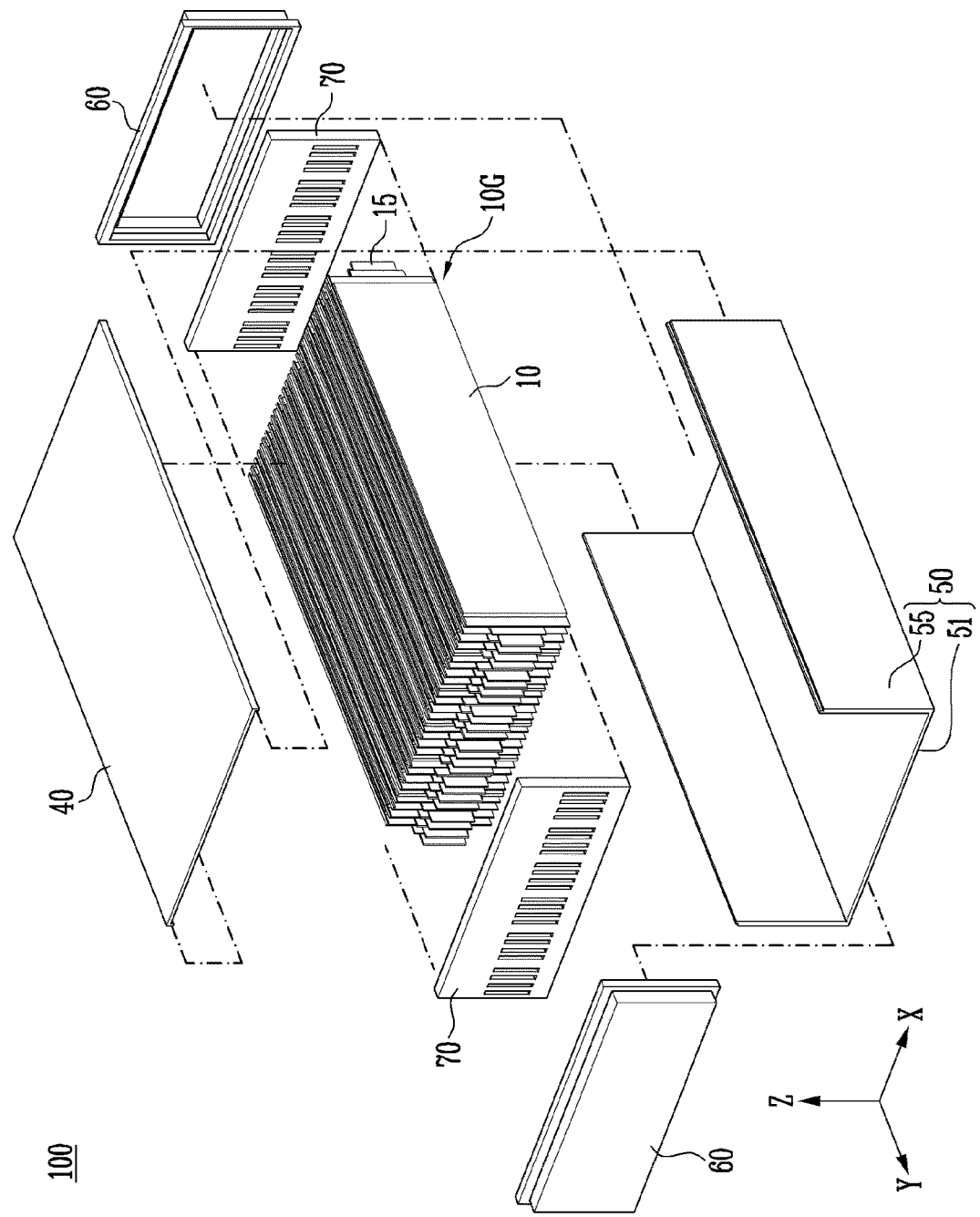
FIG. 1 is an exploded view for explaining a battery module according to an Example.
Figure 2:
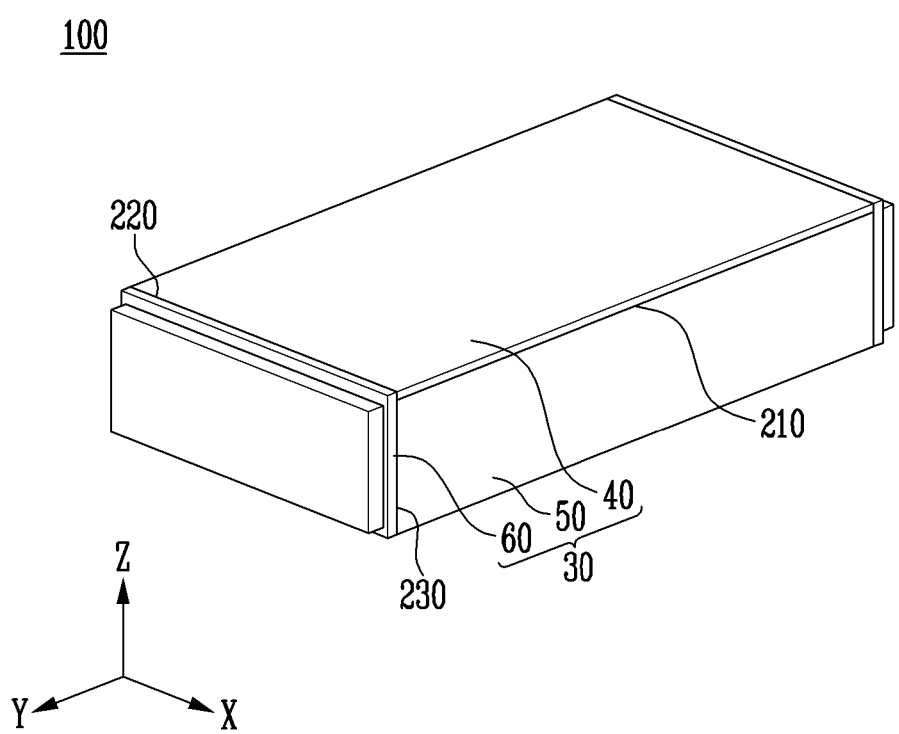
FIG. 2 is a diagram for explaining a battery module according to an Example.

FIG. 1 is an exploded view for explaining a battery module according to an Example. FIG. 2 is a diagram for explaining a battery module according to an Example. FIG. 2 represents an assembled form of the battery module of FIG. 1.

Referring to FIGS. 1 and 2, a battery module 100 according to an Example comprises a cell stack 10G and a module case 30. A battery module 100 according to an Example may further comprise a busbar 70.

A cell stack 10G may comprise a plurality of battery cells 10.

A battery cell 10 may be a secondary battery capable of being repeatedly charged and discharged. For example, a battery cell 10 may be a lithium ion battery. However, this is only an Example, and the type of a battery cell 10 is not limited thereto. Battery cells 10 may be stacked in one direction. For example, battery cells 10 may be stacked in the X-axis direction.

A battery cell 10 may comprise an electrode assembly, an exterior material, and an electrode tab 15. An electrode assembly may comprise an electrode, a separator, and an electrolyte. An electrode may comprise a cathode and an anode. An exterior material may cover an electrode assembly. In other words, an electrode assembly may be accommodated in an inner space formed by an exterior material. An electrode tab 15 may contact an electrode of an electrode assembly to be electrically connected thereto. For example, an electrode tab 15 may comprise a cathode tab that is connected to a cathode of an electrode assembly and an anode tab that is connected to an anode of the electrode assembly. An electrode tabs 15 may protrude in a direction different from the stacking direction of battery cells 10. For example, an electrode tab 15 may protrude in the Y-axis direction.

The type of a battery cell 10 may be a pouch type. For example, an exterior material of a battery cell 10 may be an aluminum laminate film. However, this is only an Example, and the type of a battery cell 10 is not limited and may be modified into a cylindrical type, a prismatic type, or the like.

A module case 30 may cover the outside of a cell stack 10G. For example, a module case may cover upper, lower, left, right, front, and rear portions of a cell stack 10G. In other words, a cell stack 10G may be accommodated in the inner space formed by a module case 30.

A module case 30 may comprise an upper case 40, a lower case 50, and a side case 60. In an Example, a lower case 50 may comprise a lower plate 51 and an end plate 55.

An upper case 40 may be disposed on an upper portion a cell stack 10G. A lower plate 51 may be disposed on a lower portion a cell stack 10G. An end plate 55 may be disposed on each of the front and rear surfaces of a cell stack 10G. A side case 60 may be disposed on each of the left and right sides of a cell stack 10G. For example, an upper portion may indicate the +Z-axis direction and a lower portion may indicate the −Z-axis direction. A front surface may indicate the +X-axis direction, and the rear surface may indicate the −X-axis direction. A left side may indicate the +Y-axis direction, and the right side may indicate the −Y-axis direction. Meanwhile, although FIG. 1 illustrates a lower plate 51 and an end plate 55 that are manufactured as an integrated component, this is only one Example, and a lower plate 51 and an end plate 55 may be manufactured as separate components and may be coupled by using such methods as welding or bolting.

Referring to FIG. 2, an upper case 40, a lower case 50, and a side case 60 may be coupled to each other through welding. For example, a first boundary area 210 of an upper case 40 and a lower case 50, a second boundary area 220 of an upper case 40 and a side case 60, and a third boundary area 230 of a lower case 50 and a side case 60 may be welded. In this case, a welding portion may be formed in the first boundary area 210, the second boundary area 220, and the third boundary area 230.

Hereinafter, a method of welding two cases of an upper case 40, a lower case 50, and a side case 60 will be described in detail.

Figure 3A:
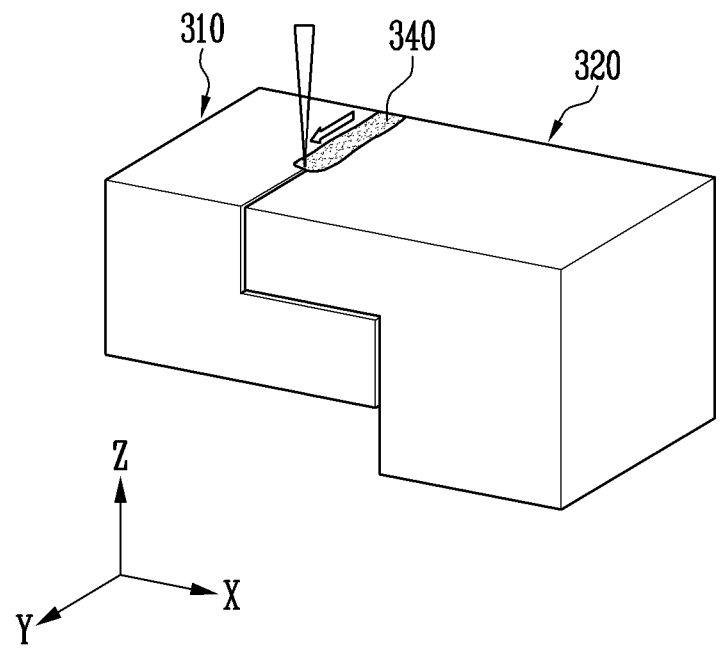
FIG. 3A is a diagram for explaining welding of a first case and a second case according to an Example.
Figure 3B:
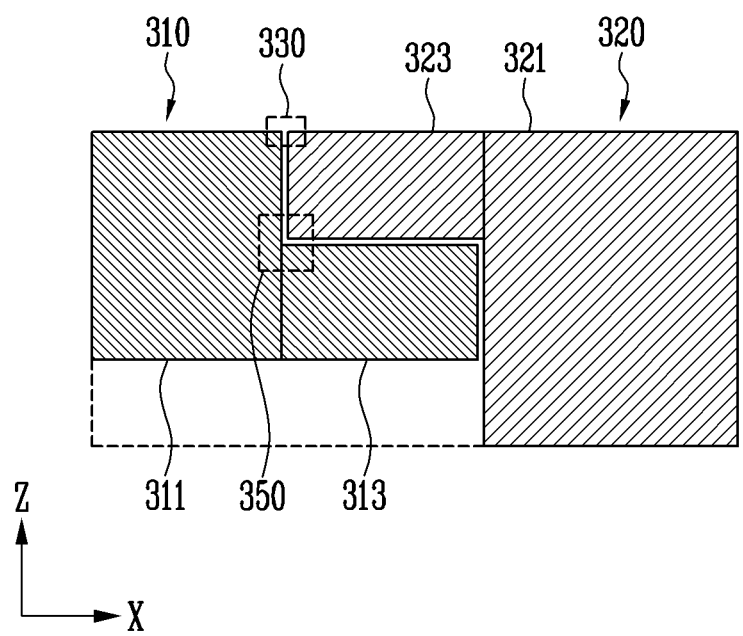
FIG. 3B is a cross-sectional view for explaining welding of a first case and a second case according to an Example.

FIG. 3A is a diagram for explaining welding of a first case and a second case according to an Example. FIG. 3B is a cross-sectional view for explaining welding of a first case and a second case according to an Example. FIGS. 3A and 3B illustrate a part of a first case and a second case.

Referring to FIGS. 3A and 3B, to couple a first case 310 and a second case 320, a boundary area 330 of a first case 310 and a second case 320 may be welded to form a welding portion 340. The first case 310 and the second case 320 may be two cases of an upper case 40, a lower case 50, and a side case 60 described in FIGS. 1 and 2 above.

In an Example, a first case 310 may comprise a first coupling portion 311 and a rib 313. A first case 310 may further comprise a first body. A second case 320 may comprise a second body 321 and a second coupling portion 323.

A first coupling portion 311 may be coupled to a second coupling portion 323 of a second case 320 through welding. For example, a boundary area 330 of a first coupling portion 311 and a second coupling portion 323 may be welded to form a welding portion 340.

A rib 313 may be connected to a lower portion of a side of a first coupling portion 311. The thickness of a rib 313 may be smaller than the thickness of a first coupling portion 311. For example, the thickness may be the length in the Z-axis direction. In other words, at a lower portion of a side of a first coupling portion 311, a rib 313 may be formed to protrude in a lateral direction. When a boundary area 330 is welded, a rib 313 may shield laser so that a battery cell disposed in the inner space may not be damaged by the laser. A rib 313 may prevent a material melted by welding from falling into the inner space.

A second coupling portion 323 may be connected to a side of a second body 321. The thickness of a second coupling portion 323 may be smaller than the thickness of a first coupling portion 311. For example, the thickness may be the length in the Z-axis direction. In a state where a lower portion of a second coupling portion 323 faces an upper portion of a rib 313 and a side of the second coupling portion 323 faces an upper portion of a side of the first coupling portion 311, a boundary area 330 of the first coupling portion 311 and the second coupling portion 323 may be welded. Here, the lower portion may be a position closer to a battery cell than the upper portion.

For example, laser may be irradiated downward on a boundary area 330 of a first case 310 located in the upper direction of a cell group and a second case 320 located in the right direction of the cell group. A first body of a first case 310 may be coupled to a left side of a first coupling portion 311. A rib 313 of a first case 310 may protrude from a lower portion of a right side of a first coupling portion 311 to the right direction. A second body 321 disposed in the right direction of a cell group may be coupled to a right side of a second coupling portion 323. Here, the upper direction may be the +Z-axis direction, the lower direction may be the −Z-axis direction, the left direction may be the −X-axis direction, and the right direction may be the +X-axis direction. The −Z-axis direction and the −X-axis direction may be directions adjacent to a battery cell.

A welding portion 340 may be formed in a boundary area 330 according to a welding progress direction. In other words, a welding progress direction may be the length direction of a welding portion 340. For example, the length direction of a welding portion 340 may be the Y-axis direction.

In an Example, a welding portion 340 may be formed by laser welding. Laser welding may be a method in which a material melted by irradiating laser to the material is solidified again to be welded. A material to which laser is irradiated may be a first case 310 or a second case 320 itself, or a separate filler wire. For example, in a state where a side of a first case 310 and a side of a second case 320 are disposed to face each other, a welding portion 340 may be formed in a boundary area 330 by laser welding between the first case 310 and the second case 320. A boundary area 330 may be an area spaced as much as a reference value from the centerline between a side of a first case 310 and a side of a second case 320 facing each other. A reference value may be preset at various values. The laser may proceed in the Y-axis direction.

In an Example, a first case 310 and a second case 320 may be aluminum cases manufactured in different ways with each other.

In an Example, one of a first case 310 and a second case 320 may be an aluminum case manufactured by die casting. For example, the material of an aluminum case manufactured by die casting may be ALDC12, but is not limited thereto and may be made of various materials. Die casting is a method of processing a metal material into a desired shape by pushing a molten metal material into a mold at high pressure. Die casting has the advantage that complex shapes may be processed at a low price.

In an Example, the other of a first case 310 and a second case 320 may be an aluminum case manufactured by rolling or extrusion. For example, the material of an aluminum case manufactured by rolling or extrusion may be aluminum 5000 series or aluminum 6000 series, but is not limited thereto and may be made of various materials. Rolling is a method in which a metal material is processed into a desired shape, when a metal material is put between two rotating rollers, by pushing the metal material while pressing the metal material at high pressure. Extrusion is a method of processing a metal material into a desired shape by pushing the metal material through a hole of a die at high pressure and contracting the cross-section of the metal material.

However, when welding a case manufactured by die casting, an explosion pressure of an internal gas ejected during welding may not be distributed, and thus welding burst marks may be generated. For example, a weld burst mark may be an appearance defect such as a burr or void on the surface of a welding portion 340. According to the present disclosure, by welding a first case 310 and a second case 320 manufactured by different manufacturing methods, the appearance quality of a welding portion 340 may be improved while reducing the manufacturing cost.

Referring to FIGS. 2 to 3B, a module case 30 of the present disclosure may comprise a tunnel portion 350. A tunnel portion 350 may be formed in an area between a coupling portion 311, a rib 313, and a second case 320. A tunnel portion 350 may be formed to extend in the length direction of a welding portion 340. For example, the length direction of a welding portion 340 may be the Y-axis direction.

A tunnel portion 350 may distribute an ejection pressure of a gas generated during welding. In this case, the gas can be transported through the tunnel portion 350 and discharged to the outside, thereby preventing appearance defects caused by the high pressure of the gas. In addition, since a melted material is filled into the tunnel portion 350, swelling of a surface of the welding portion 340 due to the gas generated during welding can be prevented.

According to the present disclosure, the appearance quality of a welding portion 340 may be improved by forming a tunnel portion. Hereinafter, a tunnel portion will be described in detail.

FIGS. 4A to 4D are cross-sectional views for explaining a tunnel portion according to an Example. FIGS. 4A to 4D illustrate the cross-section of a welding portion in the length direction. For example, the cross-section can be the XZ-plane that is perpendicular to the length direction.

Referring to FIGS. 4A to 4D, a tunnel portion 350 (see FIG. 3B) may comprise a recessed portion 451a-451d.

A recessed portion 451a-451d may be an area in which a part of a second coupling portion 423 included in a second case 420 is recessed. A recessed portion 451a-451d may be formed between a first coupling portion 411 included in a first case, a rib 413, and a second coupling portion 423. Therefore, a recessed portion 451a-451d may contact each of a first coupling portion 411, a rib 413, and a second coupling portion 423. For example, a recessed portion 451a-451d may contact a side of a first coupling portion 411 and contact an upper portion of a rib 413.

In an Example, the cross-sectional shape of a recessed portion 451a-451d in the length direction of a welding portion may be at least a part of one of a polygonal shape, a circular shape, and an elliptical shape. Here, the polygonal shape may be a figure having three or more angles inside the figure, such as a triangle, a quadrangle, and a pentagon.

Figure 4A:
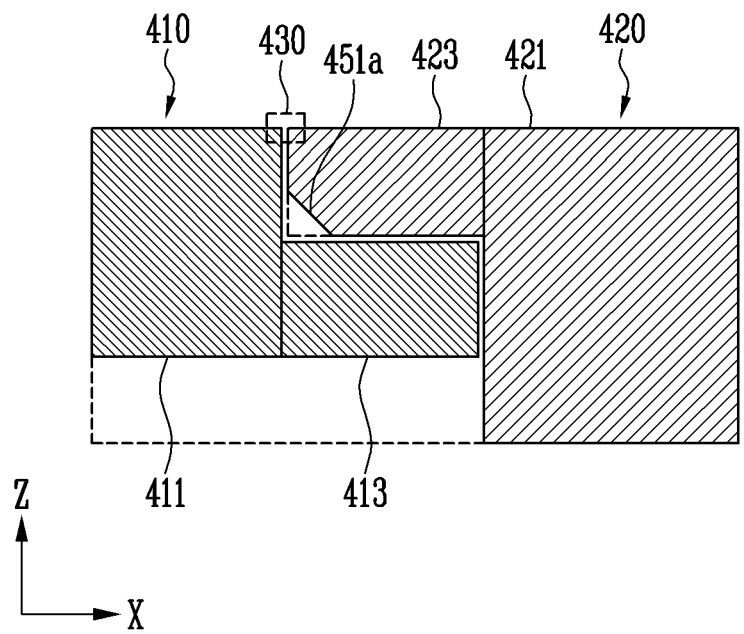
FIGS. 4A to 4D are cross-sectional views for explaining a tunnel portion according to an Example.
Figure 4B:
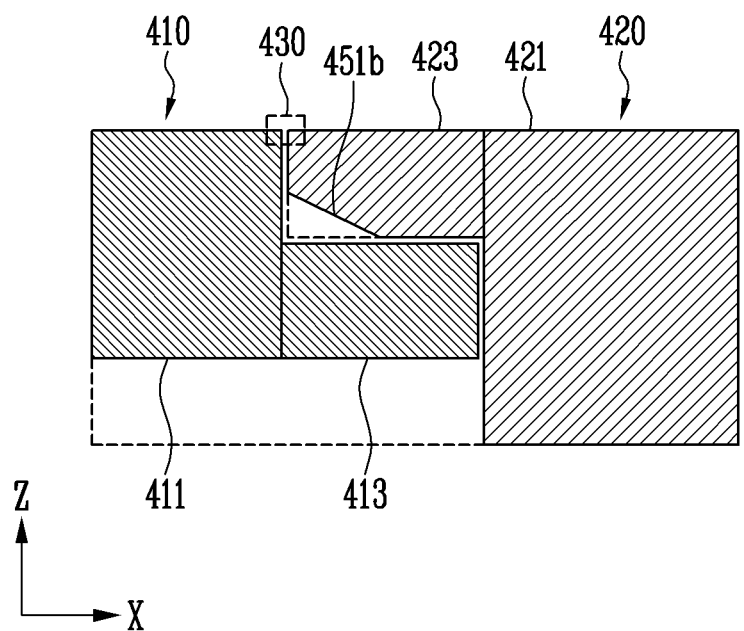

In an Example, as shown in FIGS. 4A and 4B, the cross-sectional shape of a recessed portion 451a-451d may be a right triangle. For example, as shown in FIG. 4A, the cross-sectional shape of a recessed portion 451a may be a triangle having the same height as the base length. The base length may be the length in the X-axis direction, and the height may be the length in the Z-axis direction. In another example, as shown in FIG. 4B, the cross-sectional shape of a recessed portion 451b may be a triangle having a base length and a height that are different from each other. For example, the base length may be greater than the height.

Figure 4C:
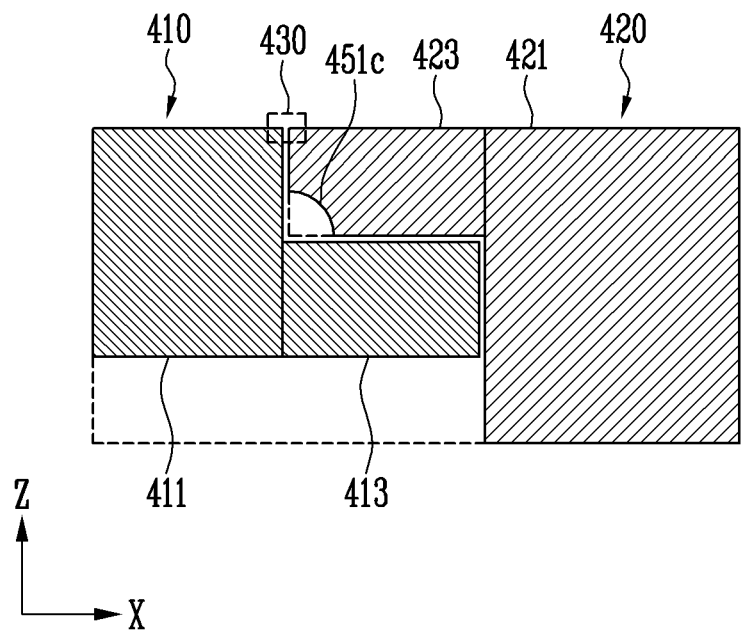
Figure 4D:
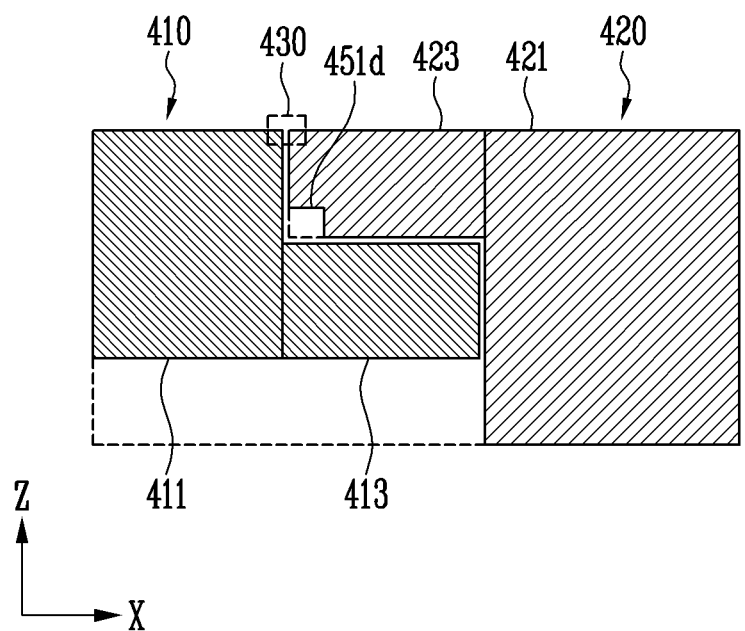

In an Example, as shown in FIG. 4C, the cross-sectional shape of a recessed portion 451c may be a part of a circle (e.g., a sector). In an Example, as shown in FIG. 4D, the cross-sectional shape of a recessed portion 451d may be a rectangle.

In an Example, the horizontal length of the cross-section of a recessed portion 451a-451d in the length direction may be equal to or greater than the vertical length of the cross-section of the recessed portion 451a-451d. Here, the horizontal length may be the length in the X-axis direction, and the vertical length may be the length in the Z-axis direction.

Specifically, the horizontal length of the cross-section of a recessed portion 451a-451d may be greater than the vertical length of the recessed portion 451a-451d. As the vertical length increases, the length of a bonding surface of a first coupling portion 411 and a second coupling portion 423 decreases and so the bonding force by welding may decrease. According to the present disclosure, the vertical length of the cross-section of a recessed portion 451a-451d is restricted to a certain level, but the horizontal length is further increased instead to secure the bonding force by welding and the cross-sectional area of a tunnel together. However, this is only one Example, and the horizontal length of the cross-section of a recessed portion 451a-451d may be the same as the vertical length of the recessed portion 451a-451d.

Figure 5A:
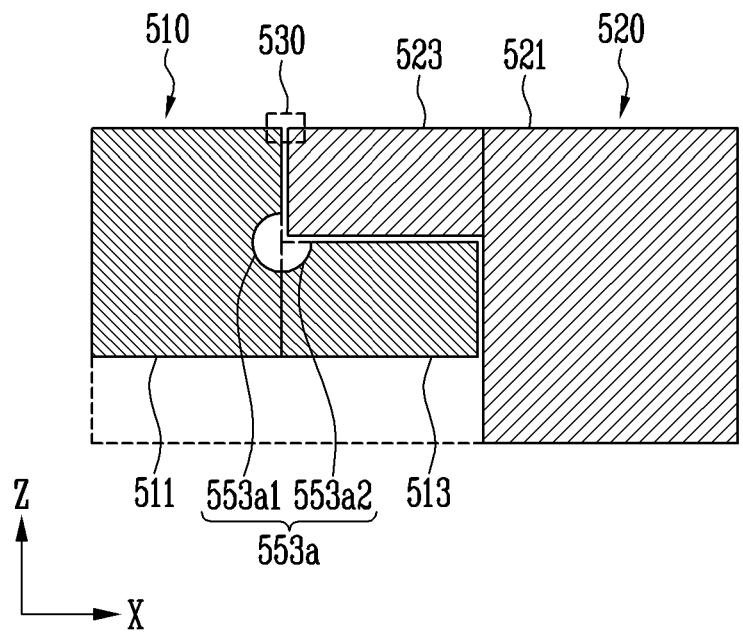
FIGS. 5A to 5C are cross-sectional views for explaining a tunnel portion according to an Example.
Figure 5B:
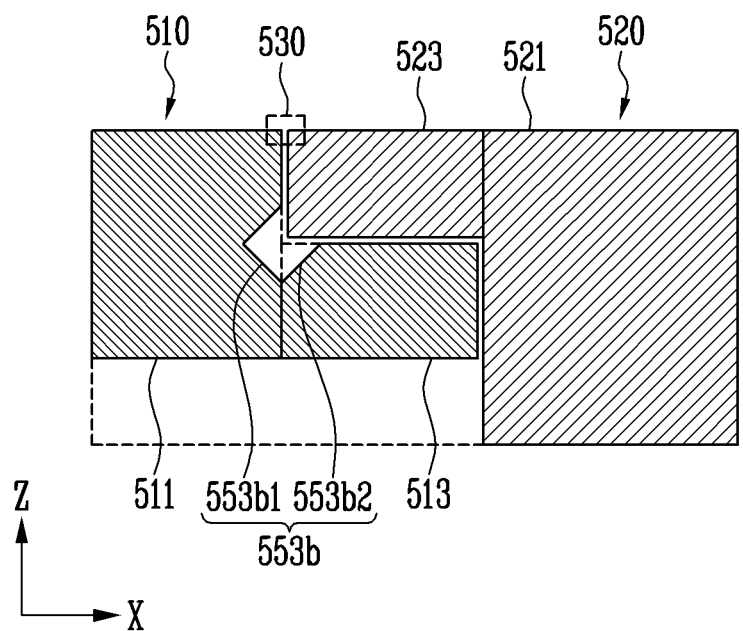
Figure 5C:
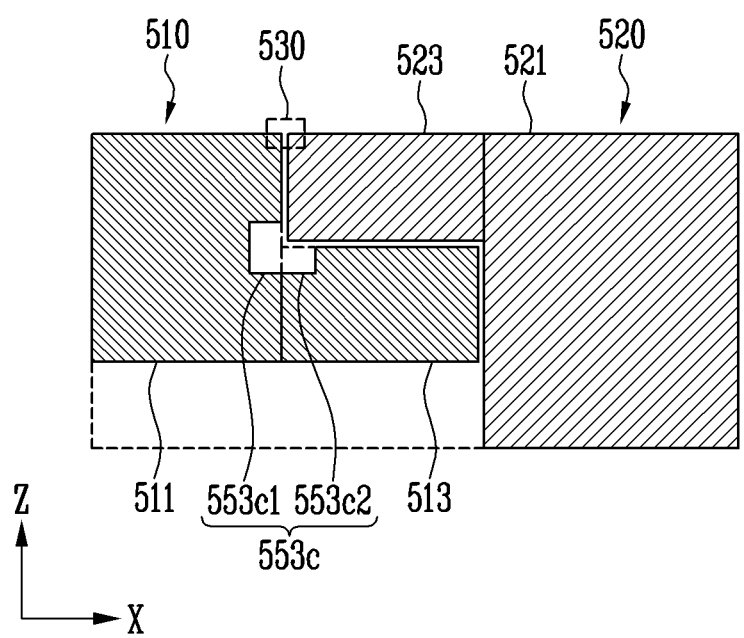

FIGS. 5A to 5C are cross-sectional views for explaining a tunnel portion according to an Example. FIGS. 5A to 5C illustrate the cross-section of a welding portion 530 in the length direction. For example, the cross-section can be the XZ-plane that is perpendicular to the length direction.

Referring to FIGS. 5A to 5C, a tunnel portion 350 (see FIG. 3B) may comprise a recessed portion 553a-553c.

A recessed portion 553a-553c may comprise a first recessed portion 553a1-553c1 and a second recessed portion 553a2-553c2. A first recessed portion 553a1-553c1 and a second recessed portion 553a2-553c2 may be connected to each other. In other words, recessed portions 553a-553c may be divided into first recessed portions 553a1-553c1 and second recessed portions 553a2-553c2.

A recessed portion 553a1-553c1 may be an area in which a part of a first coupling portion 511 of a first case 510 is recessed. A second recessed portion 553a2-553c2 may be an area in which a part of a rib 513 of a first case 510 is recessed.

A recessed portion 553a1-553c1 may contact a side of a second coupling portion 523 of a second case 520. For example, a recessed portion 553a1-553c1 may contact a lower portion of a side of a second coupling portion 523 facing a first coupling portion 511. A second recessed portion 553a2-553c2 may contact a lower portion of a second coupling portion 523 of a second case 520. For example, a second recessed portion 553a2-553c2 may contact an external end of a lower portion of a second coupling portion 523.

In an Example, a recessed portion 553a-553c may be formed such that a first coupling portion 511 and a rib 513 are spaced apart from an apex of a second coupling portion 523. Therefore, a recessed portion 553a-553c may contact an apex of a second coupling portion 523. Here, the apex of the second coupling portion 523 may be an apex corresponding to a lower portion of a welding portion 530.

In an Example, the cross-sectional shape of a first recessed portion 553a1-553c1 and a second recessed portion 553a2-553c2 in the length direction may be at least a part of a polygon, a circle, or an ellipse. Here, the polygonal shape may be a figure having three or more angles inside the figure, such as a triangle, a quadrangle, and a pentagon.

In an Example, as shown in FIG. 5A, the cross-sectional shape of a recessed portion 553a may be a part of a circular shape. For example, the cross-sectional shape of a first recessed portion 553a1 may be a semicircle, and the cross-sectional shape of a second recessed portion 553a2 may be a sector.

In an Example, as shown in FIGS. 5B and 5C, the cross-sectional shape of a recessed portion 553b, 553c may be polygonal. For example, as shown in FIG. 5B, the cross-sectional shape of a first recessed portion 553b1 and a second recessed portion 553b2 may be a triangle. For example, as shown in FIG. 5B, the cross-sectional shape of a first recessed portion 553c1 and a second recessed portion 553c2 may be a rectangle.

In an Example, the cross-sectional shape of a tunnel portion may be a combination of one of the shapes described in FIGS. 4A to 4D with one of the shapes described in FIGS. 5A to 5C. However, this is only one Example, and the cross-sectional shape of a tunnel portion may be one of the shapes described in FIGS. 4A to 4C and FIGS. 5A to 5C.

According to Examples of the present disclosure described above, a battery module 100 having improved welding quality may be provided.

What is claimed is:

1. A battery module comprising:
a cell stack comprising a plurality of battery cells; and
a module case covering an outside of the cell stack,
wherein the module case comprises:
a first case comprising a rib and a first coupling portion that has a greater thickness than that of the rib and that is connected to a side of the rib;
a second case comprising a second coupling portion facing an upper portion of the rib and a side of the first coupling portion;
a recessed portion formed between the rib, the first coupling portion, and the second coupling portion; and
a welding portion in which a boundary area of the first coupling portion and the second coupling portion is welded, and
wherein the recessed portion is where a portion of at least one of the rib, the first coupling portion, and the second coupling portion is recessed;
the recessed portion is formed to extend in a length direction of the welding portion;
the recessed portion comprises a first recessed portion in which a part of a first coupling portion is recessed and a second recessed portion in which a part of the rib is recessed;
the first recessed portion contacts a side of the second coupling portion;
the second recessed portion contacts a lower portion of the second coupling portion; and
the first recessed portion and the second recessed portion are connected to each other.

2. The battery module according to claim 1, wherein a cross-sectional shape of the first recessed portion and the second recessed portion in the length direction is at least a part of one of a polygonal shape, a circular shape, and an elliptical shape.

3. The battery module according to claim 1, wherein the first case and the second case are aluminum cases manufactured in different ways with each other.

4. The battery module according to claim 3, wherein one of the first case and the second case is an aluminum case manufactured by rolling or extrusion, and the other of the first case and the second case is an aluminum case manufactured by die casting.

5. The battery module according to claim 1, wherein the welding portion is formed by laser welding.

6. A battery module comprising:
a cell stack comprising a plurality of battery cells; and
a module case covering an outside of the cell stack,
wherein the module case comprises:
a first case comprising a rib and a first coupling portion that has a greater thickness than that of the rib and that is connected to a side of the rib;
a second case comprising a second coupling portion facing an upper portion of the rib and a side of the first coupling portion;
a recessed portion formed between the rib, the first coupling portion, and the second coupling portion; and
a welding portion in which a boundary area of the first coupling portion and the second coupling portion is welded,
wherein the recessed portion is where a portion of at least one of the rib, the first coupling portion, and the second coupling portion is recessed,
wherein the recessed portion is formed to extend in a length direction of the welding portion, and
wherein the recessed portion comprises a first recessed portion in which a part of the second coupling portion is recessed, and the first recessed portion contacts an upper portion of the rib and a side of the first coupling portion.

7. The battery module according to claim 6, wherein a cross-sectional shape of the first recessed portion in the length direction is at least a part of one of a polygonal shape, a circular shape, and an elliptical shape.

8. The battery module according to claim 6, wherein a horizontal length of a cross-section of the first recessed portion in the length direction is equal to or greater than a vertical length of the cross-section of the first recessed portion.

* * * * *